Aug. 19, 1969  R. H. FREDERICKS  3,462,192
MOTOR VEHICLE SAFETY BELT APPARATUS
Filed Dec. 27, 1967
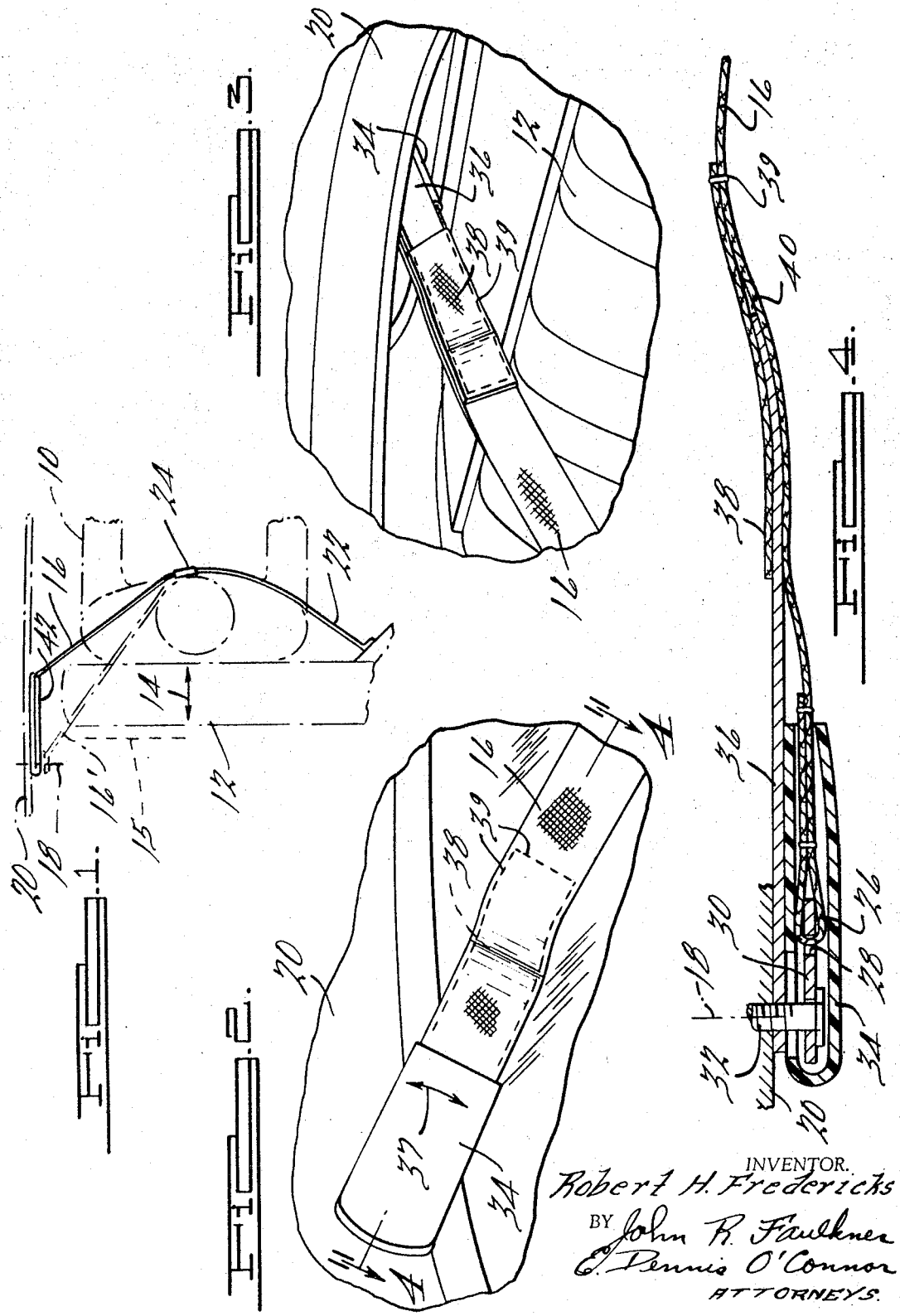
INVENTOR.
Robert H. Fredericks
BY John R. Faulkner
E. Dennis O'Connor
ATTORNEYS.

{ # United States Patent Office 3,462,192
Patented Aug. 19, 1969

3,462,192
MOTOR VEHICLE SAFETY BELT APPARATUS
Robert H. Fredericks, Birmingham, Mich., assignor to Ford Motor Company, Dearborn, Mich., a corporation of Delaware
Filed Dec. 27, 1967, Ser. No. 693,960
Int. Cl. A62b *35/00;* A47d *15/00;* B60r *21/10*
U.S. Cl. 297—389                                    8 Claims

ABSTRACT OF THE DISCLOSURE

A shoulder harness safety belt arrangement including a belt segment adapted to restrain a vehicle passenger seated in a forward facing, adjustable passenger seat. One end of the belt segment is secured to a vertically extending portion of the passenger compartment roof panel rearward of the torso of the passenger when the seat is in its most rearward position of adjustment. Resiliently deformable belt stiffening means are secured to a portion of the belt segment proximate said one end and position said portion substantially parallel to the longitudinal axis of the vehicle when no external forces are applied to the belt segment.

Background of the invention

It has been determined that the outboard belt segment of a motor vehicle safety shoulder harness must be secured to the vertically extending portion of the passenger compartment roof panel or window header rearward of the torso of a seated, forward facing passenger for optimum safety performance. Since conventional motor vehicle seats are adjustable fore and aft parallel to the longitudinal axis of the vehicle, the point of attachment of the belt segment must be located rearward of the torso line of a passenger who positions the vehicle seat at the most rearward point of seat adjustment.

A vehicle passenger who, because of personal physical dimensions and/or preference, positions the seat forward of the most rearward seat position, may find use of the shoulder harness objectionable because of this location of the outboard belt segment attachment point. This is because attachment of the belt segment end substantially rearward of the seat position results in the belt segment, when secured to a cooperating belt segment positioned inboard of the passenger, sliding up along the shoulder of the passenger and positioning itself in contact with the passenger's neck. Such a position of the outboard belt segment not only is bothersome and tends to increase the natural reticence of passengers to utilize the shoulder harness, but also results in a less than optimum functioning of the shoulder harness to restrain movement of the vehicle passenger in a crash without injury.

It is an object of my invention to provide a shoulder harness safety belt arrangement for a motor vehicle wherein the outboard belt segment may be attached to the body structure at the position described above. When in use, however, this belt segment will contact vehicle passengers in substantially the same orientation regardless of the position of the adjustable passenger seat. The outboard belt segment of the apparatus of this invention also is more simple to position for storage than conventional outboard belt segments of this type, and is less prone to entanglement when not in use.

Summary of the invention

Shoulder harness safety belt apparatus constructed in accordance with this invention is adapted for use in a motor vehicle having body structure defining a passenger compartment and an adjustable, forward facing passenger seat secured to said body structure within said compartment and capable of fore and aft movement substantially parallel to the longitudinal axis of the vehicle. This apparatus includes a flexible safety belt segment adapted to restrain a vehicle passenger seated on said seat against forward movement. Fastening means are provided to secure one end of the belt segment to the body structure at a point outboard, above and rearward of the torso of a seat occupant when the seat is in its most rearward position. An elongated spring means is operatively secured to the body structure and to a portion of the belt segment proximate to the fastening means. The spring means has a static position such that the belt segment portion proximate the fastening means is held by the spring means substantially parallel to the longitudinal axis of the motor vehicle when no external force is applied to the spring means.

Description of the drawings

FIGURE 1 is a schematic plan view of a motor vehicle occupant restrained by the safety belt apparatus of this invention;

FIGURE 2 is an isometric view of a portion of the outboard belt segment of the apparatus of FIGURE 1 viewed from the interior of the vehicle and illustrating the point of attachment of this belt segment to the vehicle body structure;

FIGURE 3 is a view similar to FIGURE 2 but illustrating a portion of the outboard belt segment as seen from the exterior of the vehicle; and FIGURE 4 is a sectional view taken along the line 4—4 of FIGURE 2.

Detailed description of the invention

Referring now in detail to the drawings and in particular to FIGURE 1, the numeral 10 denotes a motor vehicle passenger seated on a vehicle seat having a seat back 12. This seat is a conventional motor vehicle seat and is secured to the floor of a vehicle passenger floor compartment such that it is capable of fore and aft adjustment parallel to the longitudinal axis of the vehicle. This adjustment movement is represented by the arrow 14. The vehicle seat is illustrated in a position forward of its most rearward position of adjustment. The rear of the torso of a motor vehicle passenger 10, when the vehicle seat is in its most rearward adjustment position, is indicated by the dotted line 15.

The outboard belt segment of a safety shoulder harness is indicated by the numeral 16. One end of belt segment 16 is secured at point 18, in a manner to be described below, to a vertically extending portion of the vehicle roof panel or window header 20. It may be observed that attachment point 18 is located rearward of dotted line 15, i.e., rearward of the torso of passenger 10 when the adjustable vehicle seat is positioned in its most rearward location.

Outboard belt segment 16 is adapted to cooperate with an inboard belt segment 22, to which it is secured by buckle 24, to restain the torso of the vehicle passenger against forward movement or "jackknifing" during periods of rapid vehicle deceleration such as occur during a vehicle crash. Passenger 10, because of personal dimensions or preferences, has positioned the vehicle seat substantially forward of its most rearward position. It may be observed that when the adjustable vehicle seat is so positioned, a conventioal outboard belt segment illustrated in ghost at 16' approaches the passenger 10 at a severe acute angle. It readily may be appreciated that such a relative orientation of passenger 10 and conventional belt segment 16' would result in this belt segment "riding up" and contacting the neck of passenger 10. Such a belt segment orientation not only is bothersome to a passenger but also may impair the functioning of the shoulder harness apparatus during crash condtions.

FIGURE 4 illustrates the novel aspects of the shoulder harness safety belt arrangement of this invention. It may be seen from this figure that outboard belt segment 16 has a loop 26 formed at one end thereof. Loop 26 passes through an aperture 28 formed through a mounting plate 30. Mounting plate 30 is secured, at point 18, by a bolt 32 to body panel 20. A rubber boot 34 surrounds mounting plate 30 and loop 26 in the conventional manner.

Also secured to body panel 20 by bolt 32 and located between boot 34 and the body panel is a leaf spring 36. This spring may be formed from spring steel, hard rubber, plastic or other synthetic materials. Leaf spring 36 has a spring characteristic such that it is resiliently deformable by forces having the magnitude of belt loading forces during rapid vehicle deceleration. Leaf spring 36 is secured loosely to the vehicle body structure by bolt 32, so that it is capable of pivotal movement about bolt 32 as illustrated by the arrows 37 of FIGURE 2.

A length of fabric 38, similar to the fabric of which belt segments 16 is formed, is secured to segment 16 at a point along the length of segment 16 spaced from loop 26. Fabric 38 is secured to belt segment 16 by stitching 39 extending along three sides of fabric 38 such that a pocket 40 is formed between fabric 38 and segment 16. The end of leaf spring 36 remote from bolt 32 is inserted within pocket 40.

It readily may be appreciated that this arrangement provides that leaf spring 36 acts as a stiffener of a portion of outboard belt segment 16 designated by the numeral 42 in FIGURE 1. When belt segment 16 is not in use, or is in use under normal vehicle operating conditions, leaf spring 36 holds portion 42 of belt segment 16 in an orientation substantially parallel to the longitudinal axis of the vehicle. From FIGURE 1 it may be seen that due to the stiffening of portion 42 of belt segment 16 by leaf spring 36, segment 16 is oriented relative to the body of vehicle passenger 10 as if attachment point 18 were located significantly forward of its actual location. Thus a passenger positioning the vehicle seat forward of its most rearward point of seat adjustment does not have outboard belt segment 16 come in contact with his body at the severe acute angle of conventional outboard belt segment 16'. Outboard belt segment 16 will not contact the neck of passenger 10, but rather will contact the shoulder and chest of said passenger for maximum passenger comfort and shoulder harness operating efficiency.

In the event of rapid vehicle deceleration as occurs during vehicle crash conditions, the body of passenger 10 is thrown violently forward against belt segments 16 and 22. The belt segment tensioning force exerted by the body of passenger 10 has a component normal to the longitudinal axis of the vehicle sufficient to deform leaf spring 36 such that belt segment 16 assumes a straight line position similar to the position of conventional belt segment 16'. The slight effective lengthening of belt segment 16 during resilient deformation of leaf spring 36 does not impair the operating efficiency of belt segment 16. When belt segment 16 reaches the orientation illustrated at 16' at the termination of the resilient deformation of leaf spring 36, segment 16 function in the normal manner to restrain forward movement and jack-knifing of the torso of vehicle passenger 10. Upon termination of belt segment tensioning forces, the spring force of spring 36 returns belt segment 16 to its original position.

The stiffening effect of leaf spring 36 on portion 42 of belt segment 16 minimizes the possibility of belt segment 16 becoming entangled behind seat back 12 when said belt segment is not in use. Also, the pivotal movement of leaf spring 36 about bolt 32 does not impede storage of belt segment 16 when not in use along panel 20 in the conventional manner.

It thus may be seen that this invention provides safety belt apparatus for use as a motor vehicle shoulder harness wherein the outboard belt segment is secured rearward of the torso of the forward facing motor vehicle passenger when the seat occupied by said passenger is in its most rearward position of adjustment, but wherein said belt segment does not contact the neck of a vehicle passenger positioning the vehicle seat forward of the most rearward position of seat adjustment. The outboard seat belt segment of this invention functions in the conventional manner to restrain the forward movement of the torso of a vehicle passenger and is easy to store and is not prone to entanglement when not in use.

It is to be understood that this invention is not limited to the exact construction illustrated and described above or the abstract preceding this specification, but that various changes and modifications may be made without departing from the spirit and scope of the invention.

I claim:

1. Safety belt apparatus for use in a motor vehicle having body structure defining a passenger compartment and a passenger seat secured to said body structure within said compartment, said apparatus including a safety belt segment adapted to restrain a vehicle passenger seated on said seat, fastening means securing one end of said belt segment to said body structure above and outboard of said seat, resilient belt segment stiffening means operatively secured to a portion of said belt segment proximate to said fastening means and urging said portion of said belt segment into a position substantially parallel to the longitudinal axis of said vehicle.

2. The apparatus of claim 1, wherein said seat is forward facing and said one belt segment end is secured to said body structure rearward of the torso of a seat occupant.

3. The apparatus of claim 2, wherein said stiffening means comprises an elongated leaf spring, one end of said spring secured to said body structure by said fastening means, the other end of said spring operatively secured to said belt segment.

4. The apparatus of claim 3, wherein said spring is pivotally secured to said body structure by said fastening means.

5. Safety belt apparatus for use in a motor vehicle having body structure defining a passenger compartment and an adjustable forward facing passenger seat secured to said body structure within said compartment and capable of fore and aft movement substantially parallel to the longitudinal axis of said vehicle, said apparatus including: a flexible safety belt segment adapted to restrain a vehicle passenger seated on said seat against forward movement; fastening means securing one end of said belt segment to said body structure at a point outboard, above and rearward of the torso of a seat occupant when said seat is in its most rearward position; elongated spring means operatively secured to said body structure and a portion of said belt segment proximate to said fastening means and having a static position such that said belt segment portion is held by said spring means substantially parallel to said vehicle axis when no external force is applied to said spring means.

6. The apparatus of claim 5, wherein one end of said spring means is pivotally connected to said body structure by said fastening means.

7. The apparatus of claim 5, wherein said spring means is a leaf spring.

8. The apparatus of claim 5, wherein one end of said spring means is secured to said body structure by said fastening means and the other end of said spring means is operatively secured to said belt segment at a point spaced from said one belt segment end; said spring means being deformable such that said other spring means end is displaced towards said vehicle axis upon a force having a component directed towards said axis and greater than the resilient force of said spring means being applied to said belt segment.

References Cited

UNITED STATES PATENTS 3,236,540 2/1966 Berton et al.
3,318,634 5/1967 Nicholas _____ 297—388

JAMES T. McCALL, Primary Examiner

U.S. Cl. X.R.

280—150; 297—388